Patented Dec. 31, 1940

2,226,823

UNITED STATES PATENT OFFICE 2,226,823

CELLULOSE ETHER COMPOSITION

Earle L. Kropscott, Midland, Mich., assignor to The Dow Chemical Company, Midland, Mich., a corporation of Michigan No Drawing. Application January 26, 1940, Serial No. 315,753

10 Claims. (Cl. 106—40)

This invention relates to cellulose ether compositions, and specifically it is concerned with plasticized water-soluble cellulose ethers.

In order to deposit plasticized films of water-soluble cellulose ethers, it is necessary that the plasticizer itself be soluble in water and in aqueous solutions of the cellulose ether. The plasticizer should be further characterized by low volatility, so as to remain in the deposited film, and by having little hygroscopicity. If the plasticizer is too volatile, the film of cellulose ether becomes increasingly brittle, just as in the case of the water-insoluble cellulose ethers. If the plasticizer is too hygroscopic, the deposited cellulose ether films are not stable in the sense that they gradually soften and become weak in humid atmospheres, and harden and gain strength in dry atmospheres. It is, of course, desirable to maintain approximately constant the hardness and strength of films of plasticized water-soluble cellulose ethers, and therefore the plasticizer must be but slightly hygroscopic. Some moisture is desirable in the film, as it appears to aid in flexibilizing the cellulose ether, but the amount of moisture must be kept down.

The plasticizers heretofore employed have each failed in at least one of the above-outlined requirements. Thus, ethylene glycol is too volatile, and water-soluble cellulose ether films containing it gradually lose their flexibility and become relatively brittle, due to its evaporation from the film. Similarly, glycerine has been found to be too hygroscopic and to soften films of water-soluble cellulose ethers unduly in humid atmospheres. If the amount of glycerine is reduced to minimize the ill effects resulting from its hygroscopic nature, the film is found to be insufficiently plasticized to be flexible.

The water-soluble cellulose ethers, including methyl cellulose, certain lowly substituted ethyl celluloses, hydroxy ethyl cellulose, salts of cellulose glycolic acid, and the like, have a place of importance as free films or foils and as coatings for paper. Due to the non-toxic nature of these cellulose ethers and to their properties of being grease-proof and flexible over a wide range of temperatures (when properly plasticized), they can be employed advantageously for wrapping or packaging foodstuffs, especially greasy or oily foods such as butter, lard, potato chips, nuts, and the like. When plasticized to provide the flexibility required for these suggested uses, it is important that the plasticizer be one which is itself resistant to greases and oils.

It is accordingly among the objects of the invention to provide a plasticized composition of a water-soluble cellulose ether, wherein the plasticizer is water-soluble, is non-volatile and of low hygroscopicity as compared with glycol and glycerine, and is not compatible with oils, greases and fats. A further object is to provide such a water-soluble cellulose ether composition which is capable of forming films or paper coatings which are stable as to flexibility and strength through a wide change in temperature and atmospheric humidity conditions. Other objects and advantages of the invention will appear as the description proceeds.

To the accomplishment of the foregoing and related ends, the invention, then, consists of the features hereinafter fully described and particularly pointed out in the claims, the following description setting forth in detail several approved combinations of ingredients embodying the invention, such disclosed combinations constituting, however, but some of various forms in which the principle of the invention may be used.

It has now been found that water-soluble cellulose ethers may be plasticized to attain the desired results by incorporating therewith a polyhydric aliphatic alcohol containing from 4 to 6 hydroxyl groups. Such plasticizers include the compounds erythritol and penta-erythritol; xylitol, arabinitol, and similar pentitols; and mannitol, sorbitol, and similar hexitols. These plasticizers, when employed in compositions of water-soluble cellulose ethers, retain sufficient moisture in the cellulose ether to keep films and coatings thereof flexible under conditions of low atmospheric humidity, and yet do not pick up so much moisture at high humidities that the film or coating will be unduly weakened. These plasticizers also prevent shrinking and curling of water-soluble cellulose ether compositions containing them, especially when the compositions are employed for paper coating purposes. The new compositions, then, when in film form, are dimensionally stable through a wide range of humidity changes.

The amount of plasticizer in the compositions may be varied from about 5 to about 60 per cent of the weight of water-soluble cellulose ether present. Thus, in compositions consisting principally of the cellulose ether and plasticizer, the latter varies from about 5 to about 40 per cent of the "dry weight" of the composition.

The effect of some representatives of the herein-claimed plasticizers on the strength of methyl cellulose films, under various conditions of humidity is given in the following Table I, and is there compared with the effect of glycerine and of ethylene glycol when similarly employed. The data in Table I are divided into three series of tests. The tests of series 1 were made on plasticized methyl cellulose films which had been conditioned under uniform conditions at 70° F. in an atmosphere of 50 per cent relative humidity. The stated amount of plasticizer is based on the total composition weight. The tests of series 2 were made to determine the effect of varying moisture conditions on the plasticized methyl cellulose films. These films were heated to 110° C. for 1 hour, and then, after being weighed, were stored for 1 week, either at 50 per cent or at 90 per cent relative humidity, as shown in the table, and finally reweighed. The tests of series 3 were made on similar films which had been heated for 14 days at 70° C., and then conditioned at 70° F. and 50 per cent relative humidity. The tensile strength results before and after heating give an indication of the volatility of the plasticizer, since loss of plasticizer on heating will be followed by film properties which approach those of the unplasticized methyl cellulose. In the table, yield point and tensile strength values are reported in terms of kilograms per square centimeter of original cross section cellulose plasticized with various polyhydric alcohols containing 4 or more hydroxyl groups. Other water-soluble cellulose ethers may be substituted for the methyl cellulose of the examples, with equally desirable results. Likewise, there may be employed as plasticizers polyhydric alcohols containing from 4 to 6 hydroxyl groups, other than those shown in the examples. Further examples, both of the water-soluble cellulose ethers and of the polyhydric alcohol plasticizers, have been enumerated hereinbefore.

The new products are flexible, strong, resistant to greases, oils and fats, and are not seriously or adversely affected by changes in atmospheric humidity or temperature over a wide range of such changes.

Other modes of applying the principle of my

TABLE I

| Plasticizer, kind | Amount | Series 1 | | | Series 2, moisture absorption— | | Series 3, stability—70° C.—14 days | | |
|---|---|---|---|---|---|---|---|---|---|
| | | Yield point | Tensile strength | Elongation, percent | At 50% rel. humidity | At 90% rel. humidity | Yield point | Tensile strength | Elongation, percent |
| Blank | | 680 | 1030 | 30 | 9.0 | 21 | 700 | 900 | 20 |
| Sorbitol | 15 | 520 | 835 | 35 | 4.8 | 35 | 545 | 780 | 22 |
| Mannitol | 15 | 505 | 610 | 20 | 5.1 | 22 | 575 | 770 | 25 |
| Penta-erythritol | 15 | 520 | 660 | 25 | 5.8 | 26 | 505 | 600 | 18 |
| Glycerine [1] | 15 | 380 | 800 | 50 | 5.6 | 46 | 545 | 745 | 24 |
| Ethylene glycol [1] | 15 | 620 | 1205 | 40 | 4.8 | ([2]) | 700 | 900 | 20 |
| Sorbitol | 30 | 365 | 675 | 45 | 6.0 | 40 | 365 | 515 | 29 |
| Mannitol | 30 | 400 | 510 | 25 | 5.4 | 19 | 395 | 560 | 32 |
| Penta-erythritol | 30 | | 645 | | 4.0 | 22 | | 430 | |
| Glycerine [1] | 30 | 205 | 405 | 50 | 5.9 | 66 | 485 | 690 | 26 |
| Ethylene glycol [1] | 30 | 470 | 1020 | 50 | 3.3 | | 700 | 900 | 20 |

[1] For comparison.
[2] Too soft to handle.

From the foregoing table, it is observed that films of methyl cellulose containing about 15 per cent of one of the new plasticizers therefor are not subject to as wide changes in moisture content as are those containing glycerine and glycol (series 2). They are not as soft as are films containing glycerine (series 1). They are not volatilized from the film as readily as is glycol (series 3).

As further illustration of the moderate softening effect of the new plasticizers as compared with glycerine when incorporated in methyl cellulose films, the following data are given in Table II. In the table is plotted the relation between plasticizer concentration (based on the total composition weight) and yield point hardness index. The hardness index is expressed numerically as the hardness of a plasticized cellulose ether as compared with the hardness of an unplasticized film of the same cellulose ether taken as 100. Since yield point is a measure of hardness, the hardness index may be computed on the basis of relative yield points of the compositions. This comparison is here designated as "yield point hardness index."

TABLE II

Yield point hardness index

| Plasticizer Percent | 0 | 5 | 10 | 15 | 20 | 25 | 30 |
|---|---|---|---|---|---|---|---|
| Kind— | | | | | | | |
| Penta-erythritol | 100 | 90 | 82 | 77 | 72 | 67 | 63 |
| Mannitol | 100 | 87 | 80 | 74 | 69 | 64 | 59 |
| Sorbitol | 100 | 91 | 83 | 76 | 68 | 61 | 54 |
| Glycerine* | 100 | 82 | 68 | 56 | 45 | 37 | 30 |

*For comparison.

The invention has been illustrated with respect to compositions of water-soluble methyl invention may be employed instead of those explained, change being made as regards the materials employed, provided the ingredients stated by any of the following claims or the equivalent of such stated ingredients be employed.

I therefore particularly point out and distinctly claim as my invention:

1. As a new composition of matter, a water-soluble cellulose ether plasticized with a compatible, water-soluble polyhydric aliphatic alcohol containing from 4 to 6 hydroxyl groups, inclusive.

2. As a new composition of matter, a water-soluble cellulose ether plasticized with from 5 to 60 per cent of its weight of a compatible, water-soluble polyhydric aliphatic alcohol containing from 4 to 6 hydroxyl groups, inclusive.

3. As a new composition of matter, water-soluble methyl cellulose placticized with a compatible, water-soluble polyhydric aliphatic alcohol containing from 4 to 6 hydroxyl groups, inclusive.

4. As a new composition of matter, water-soluble methyl cellulose plasticized with from 5 to 60 per cent of its weight of a compatible, water-soluble polyhydric aliphatic alcohol containing from 4 to 6 hydroxyl groups, inclusive.

5. As a new composition of matter, a water-soluble cellulose ether plasticized with from 5 to 60 per cent of its weight of mannitol.

6. As a new composition of matter, a water-soluble cellulose ether plasticized with from 5 to 60 per cent of its weight of sorbitol.

7. As a new composition of matter, water-soluble methyl cellulose plasticized with from 5 to 60 per cent of its weight of mannitol.

8. As a new composition of matter, water-soluble methyl cellulose plasticized with from 5 to 60 per cent of its weight of sorbitol.

9. A plasticized film of a water-soluble cellulose ether, wherein the plasticizer is a compatible polyhydric aliphatic alcohol containing from 4 to 6 hydroxyl groups, inclusive, the said plasticizer being present in amount between 5 and 60 per cent of the weight of the said cellulose ether.

10. A plasticized film of water-soluble methyl cellulose, wherein the plasticizer is a compatible polyhydric aliphatic alcohol containing from 4 to 6 hydroxyl groups, inclusive, the said plasticizer being present in amount between 5 and 60 per cent of the weight of the said methyl cellulose.

EARLE L. KROPSCOTT.